US012459259B2

(12) United States Patent
Yoshino et al.

(10) Patent No.: US 12,459,259 B2
(45) Date of Patent: Nov. 4, 2025

(54) LIQUID EJECTING HEAD

(71) Applicant: BROTHER KOGYO KABUSHIKI KAISHA, Nagoya (JP)

(72) Inventors: Takaaki Yoshino, Nagoya (JP); Toru Kakiuchi, Chita (JP); Taisuke Mizuno, Yokkaichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 164 days.

(21) Appl. No.: 18/392,126

(22) Filed: Dec. 21, 2023

(65) Prior Publication Data

US 2024/0391237 A1 Nov. 28, 2024

(30) Foreign Application Priority Data

May 25, 2023 (JP) ................................ 2023-086512

(51) Int. Cl.
*B41J 2/14* (2006.01)

(52) U.S. Cl.
CPC .. *B41J 2/14233* (2013.01); *B41J 2002/14306* (2013.01); *B41J 2002/14475* (2013.01)

(58) Field of Classification Search
CPC .......... B41J 2/14233; B41J 2002/14306; B41J 2002/14475; B41J 2202/11; B41J 2202/12
See application file for complete search history.

(56) References Cited

U.S. PATENT DOCUMENTS

2021/0155000 A1* 5/2021 Kakiuchi ............. B41J 2/14201

FOREIGN PATENT DOCUMENTS

JP 2008238485 A 10/2008
JP 2021084283 A 6/2021

* cited by examiner

*Primary Examiner* — Lisa Solomon
(74) *Attorney, Agent, or Firm* — Element IP, PLC

(57) ABSTRACT

There is provided a liquid ejecting head including a flow channel member and a piezoelectric element. The flow channel member includes a flow channel including a nozzle and a pressure chamber connected to the nozzle. The piezoelectric element is fixed to the flow channel member that applies pressure to the liquid in the pressure chamber and causes droplets to be ejected from the nozzle. The natural frequency Fr of the flow channel is 120 kHz or higher. The diameter D [μm] of the nozzle and the taper angle θ [°] of the nozzle satisfy the relationships: $\theta \geq 2.1 \times D - 36.4$, $D > 22$ μm, and $\theta < 45°$.

9 Claims, 5 Drawing Sheets

LIQUID EJECTING HEAD

REFERENCE TO RELATED APPLICATIONS

This application claims priority from Japanese Patent Application No. 2023-086512 filed on May 25, 2023. The entire content of the priority application is incorporated herein by reference.

BACKGROUND ART

It is known that when the piezoelectric element is driven at a drive frequency of 50 kHz or higher under the condition that the nozzle diameter is 18 to 22 μm, a nozzle taper angle of 6° or higher is sufficient to eject liquid from the nozzle stably.

SUMMARY

To achieve high-speed recording, the drive frequency may be increased. A means of increasing the drive frequency is to increase the natural frequency Fr of the flow channel.

However, when the natural frequency Fr is increased, a higher drive voltage must be applied to the piezoelectric element to eject a predetermined amount of droplets from the nozzle, depending on the nozzle diameter and the nozzle taper angle.

When a high drive voltage is applied to a piezoelectric element, the amount of heat generated increases based on the law of Joule heating. When the heat from the piezoelectric element is transferred to the liquid in the flow channel, the viscosity of the liquid decreases. The lower the viscosity of the liquid, the larger the droplet size ejected from the nozzles. The larger the droplets ejected from the nozzles, the higher the image density formed by the droplets. As a result, the amount of heat generated by the piezoelectric element fluctuates during recording, resulting in uneven density in the image.

The purpose of the present disclosure is to provide a liquid ejecting head that contributes to lowering the drive voltage applied to the piezoelectric element even when the piezoelectric element is driven at a high drive frequency, and that contributes to ejecting droplets stably from the nozzles.

According to an aspect of the present disclosure, there is provided a liquid ejecting head including: a flow channel member and a piezoelectric element. The flow channel member includes a flow channel including a nozzle and a pressure chamber connected to the nozzle. The piezoelectric element is fixed to the flow channel member. The piezoelectric element applies pressure to the liquid in the pressure chamber to eject droplets from the nozzle. The natural frequency Fr of the flow channel is 120 kHz or higher. The diameter D [μm] of the nozzle and the taper angle θ [°] of the nozzle satisfy: $\theta \geq 2.1 \times D - 36.4$, $D > 22$ μm, and $\theta < 45°$.

DESCRIPTION

[Overall Configuration of the Printer 100]

Figure 1:
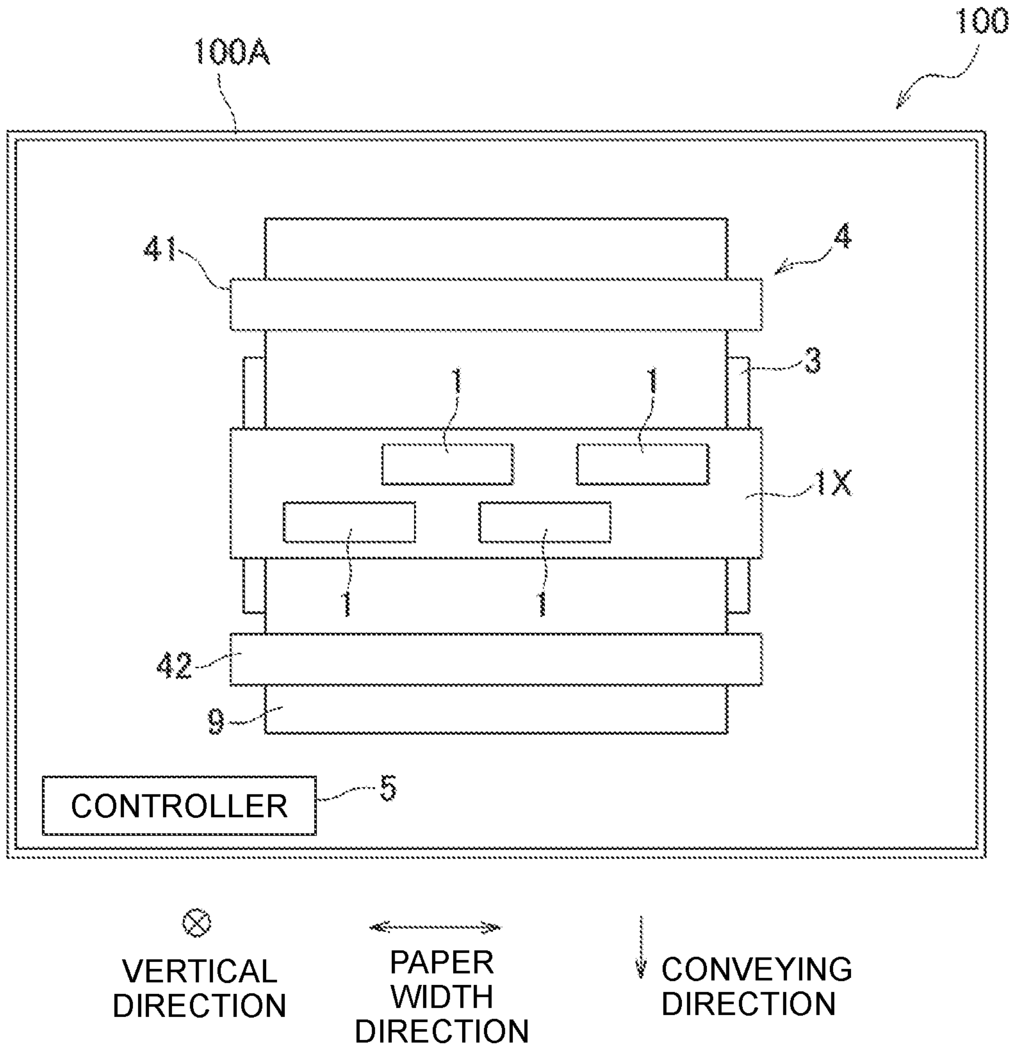
FIG. 1 depicts a plan view of the printer 100 including the head 1.

A printer 100 according to an embodiment of the present disclosure includes a plurality of heads 1, as depicted in FIG. 1.

The printer 100 has a housing 100A, a head unit 1X, a platen 3, a conveyor 4, and a controller 5. The head unit 1X, the platen 3, the conveyor 4, and the controller 5 are located in the housing 100A.

The length of the head unit 1X in the paper width direction is longer than the length of the head unit 1X in the conveying direction. The paper width direction is along the width of the paper 9 and is perpendicular to the vertical direction. The head unit 1X is fixed to the housing 100A. The head unit 1X is an inkjet head of the line type.

The head unit 1X includes four heads 1. The four heads 1 are located in a staggered pattern in the paper width direction. The length of the heads 1 in the paper width direction is longer than the length of the heads 1 in the conveying direction.

The platen 3 is a plate-like member along a plane perpendicular to the vertical direction and is located below the head unit 1X. The paper 9 is supported on an upper surface of the platen 3.

Figure 2:
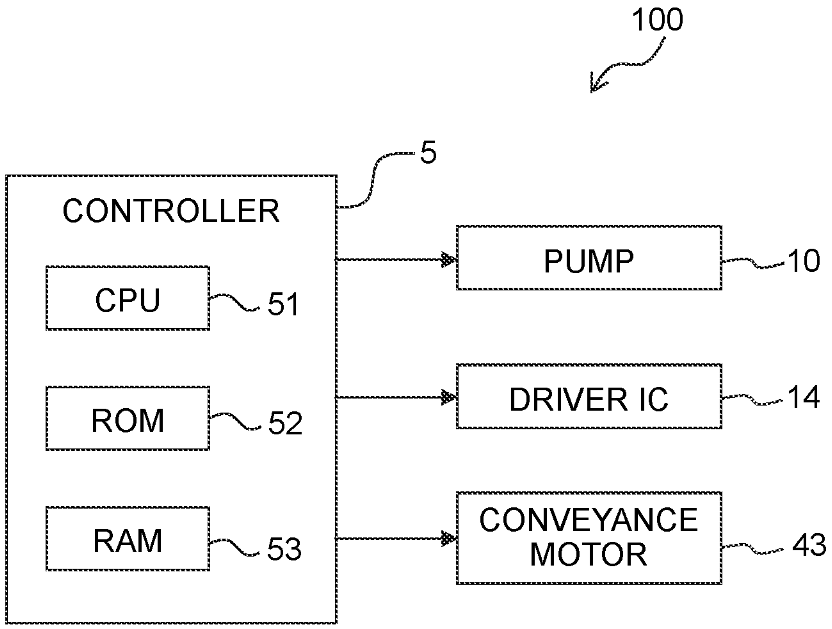
FIG. 2 depicts a block diagram indicating the electrical configuration of the printer 100.

The conveyor 4 includes a roller pair 41 with two rollers, and a conveyance motor 43 depicted in FIG. 2. In the conveying direction, the head unit 1X and the platen 3 are located between the roller pair 41 and the roller pair 42. The conveying direction is orthogonal to the vertical direction and the paper width directions.

When the conveyance motor 43 is driven by the controller 5, the rollers of the roller pairs 41, 42 rotate. As the rollers of the roller pairs 41 and 42 rotate, the paper 9 held by the rollers of the roller pairs 41 and 42 is conveyed in the conveying direction.

The controller 5 includes a CPU 51, a ROM 52, and a RAM 53, as depicted in FIG. 2.

The CPU 51 executes various controls based on data input from external devices and according to programs and data stored in the ROM 52 and the RAM 53. The external device is, for example, a personal computer (PC).

The ROM 52 stores programs and data for the CPU 51 to perform various controls. The RAM 53 temporarily stores data used by the CPU 51 to execute programs.

[Configuration of Heads 1]

Figure 4:
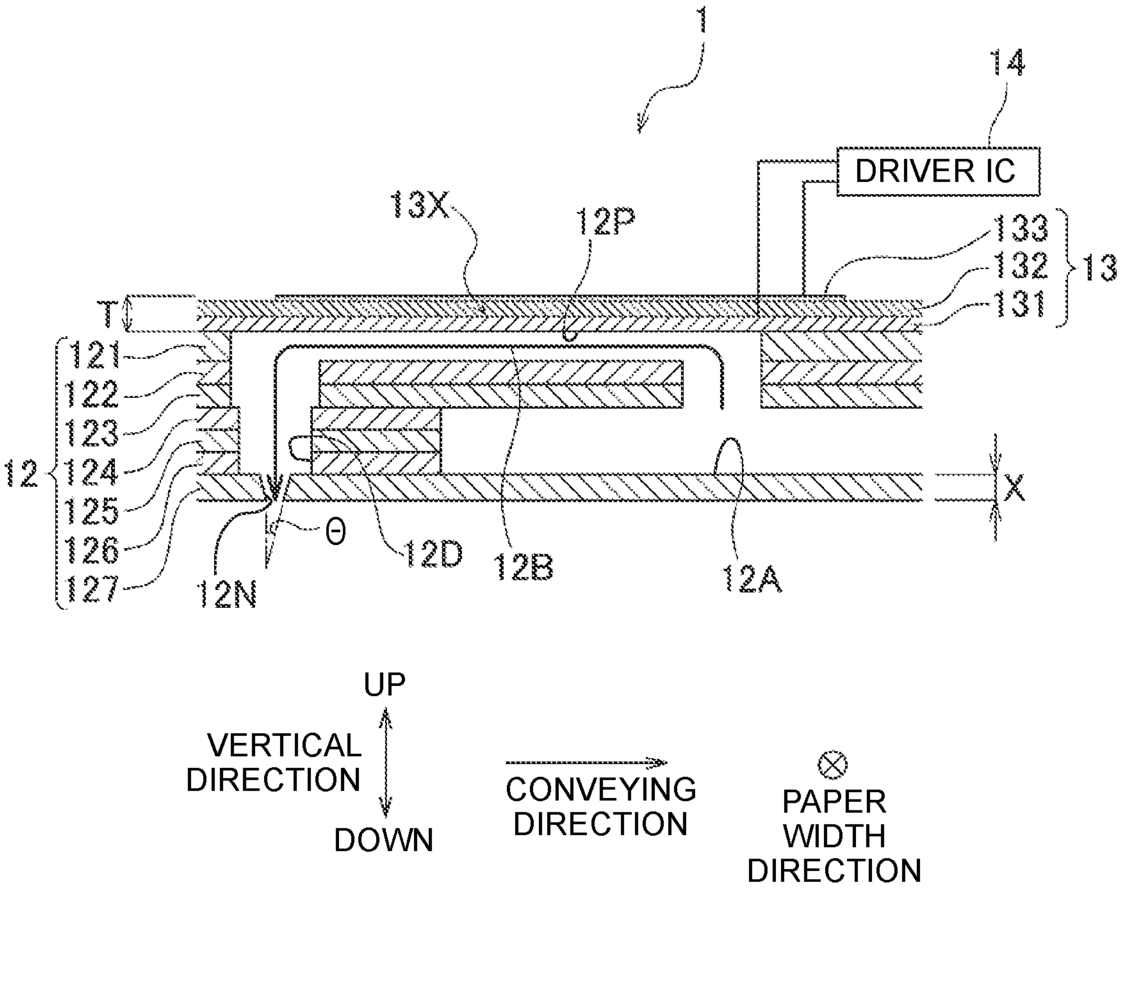
FIG. 4 depicts a cross-sectional view of head 1 along a IV-IV line of FIG. 3.

Each of the heads 1 includes a flow channel member 12 and an actuator 13, as depicted in FIG. 4.

Figure 3:
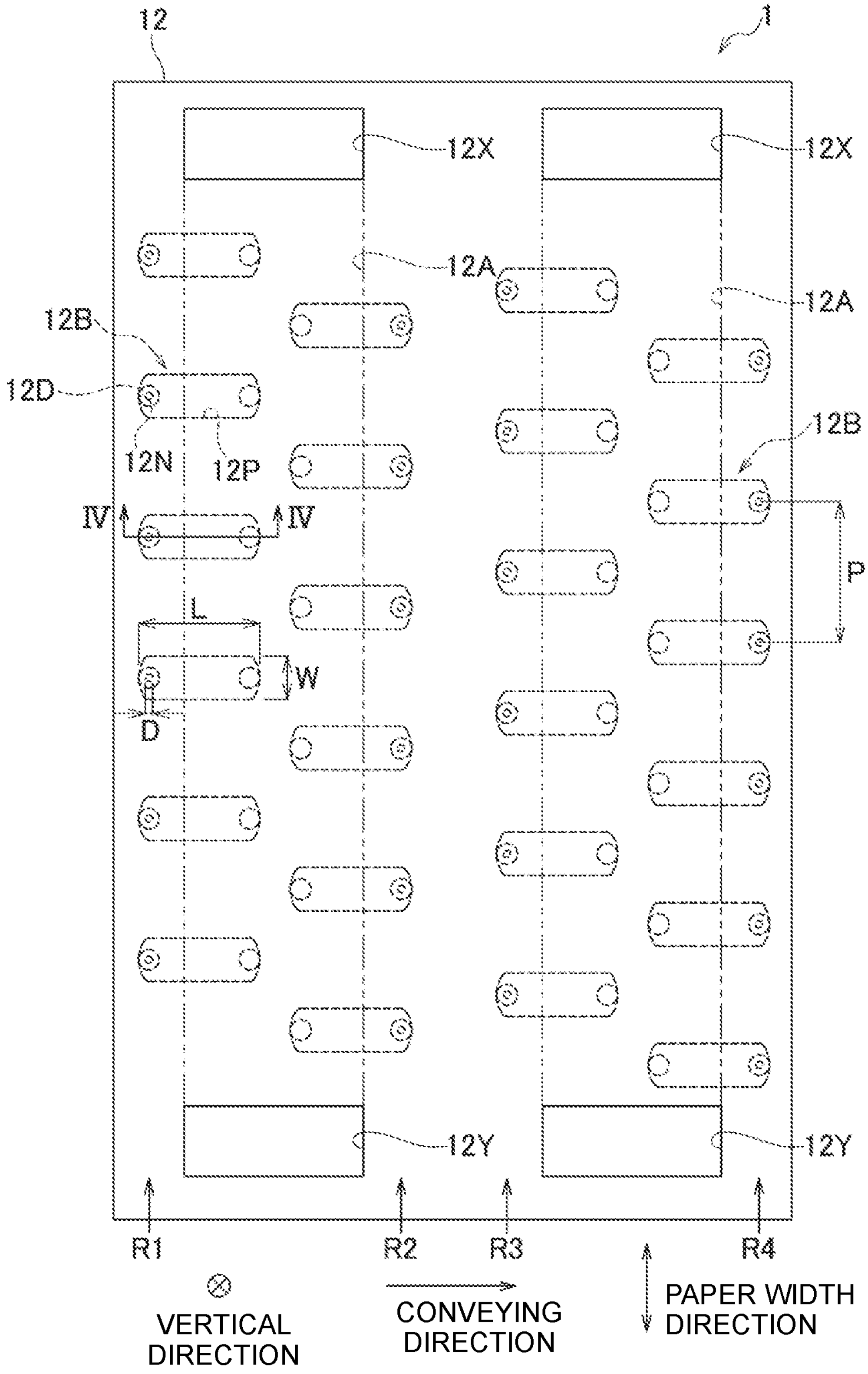
FIG. 3 depicts a plan view of head 1.

Two supply ports 12X and two return ports 12Y open on the upper surface of the flow channel member 12, as depicted in FIG. 3. The two supply ports 12X are located at one end of the paper width direction in the flow channel member 12. The two return ports 12Y are located at the other end of the paper width direction in the flow channel member 12. The supply ports 12X and the return ports 12Y are connected to the ink tank via tubes.

The flow channel member 12 includes two manifolds 12A and a plurality of individual channels 12B.

The two manifolds 12A are aligned in the conveying direction and extend in the paper width direction, respectively. The supply ports 12X are connected to one end of the manifolds 12A in the paper width direction. The return ports 12Y are connected to the other end of the manifolds 12A in the paper width direction. Each of the manifolds 12A is connected to the ink tank via one of the supply ports 12X and one of the return ports 12Y, and is connected to the plurality of individual channels 12B.

Each of the individual channels 12B includes a nozzle 12N, a pressure chamber 12P connected to the nozzle 12N, and a connecting channel 12D connecting the nozzle 12N and the pressure chamber 12P, as depicted in FIG. 4. Each of the individual channels 12B corresponds to a "channel" in the present disclosure. In this embodiment, the natural frequency Fr of the individual channels 12B is 120 kHz or higher from the viewpoint of increasing the drive frequency of the piezoelectric elements 13X to support high-speed recording.

The flow channel member 12 includes seven plates 121-127. Among the seven plates 121-127, the plurality of pressure chambers 12P are formed in the topmost plate 121 and the plurality of nozzles 12N are formed in the bottommost plate 127. The plurality of pressure chambers 12P are opened on the upper surface of plate 121, and the plurality of nozzles 12N are opened on the lower surface of plate 127. The openings of the pressure chambers 12P are rectangular in shape, and the openings of the nozzles 12N are circular in shape.

The plate 127 is made of metal and corresponds to a "metal member" of the present disclosure. The nozzle 12N is defined by the plate 127, which is a metal member, and is formed by laser processing or punching. The thickness X of the plate 127 (i.e., the thickness of the nozzles 12N) is 50 μm or less.

Each of the nozzles 12N has a lower-end (one end) and an upper-end (other end) that is closer to the pressure chambers 12P than the lower-end. Each of the nozzles 12N has a tapered shape from the upper-end to the lower-end. The lower-end of the nozzles 12N is an opening through which ink droplets are ejected and has a smaller diameter than the upper-end of the nozzles 12N. The lateral wall defining the nozzles 12N is inclined with respect to the vertical direction. Each of the nozzles 12N has a constant taper angle θ from the lower-end to the upper-end. The taper angle θ is defined as the acute side angle of the lateral wall defining the nozzles 12N with respect to the vertical direction.

The nozzles 12N are located in a staggered pattern in the paper width direction to form four nozzle rows R1 to R4, as depicted in FIG. 3. Each of the nozzle rows R1 to R4 includes the plurality of nozzles 12N aligned in the paper width direction.

In each of the nozzle rows R1 to R4, the plurality of nozzles 12N are located at a pitch P of 300 dpi or more in the paper width direction. In this embodiment, the recording resolution in each of the nozzle rows R1 to R4 is 300 dpi, and the pitch P is about 84 μm. The recording resolution is the resolution of the image recorded by the ink droplets ejected from the nozzles 12N.

The positions of the nozzles 12N in the paper width direction are offset by half of the pitch P between two nozzle rows adjacent to each other in the conveying direction. As a result, when the recording resolution in each of the nozzle rows R1 to R4 is 300 dpi, a recording resolution of 1200 dpi is achieved by the four nozzle rows R1 to R4. The heads 1 in this embodiment has a recording resolution of 1200 dpi×1200 dpi in the paper width direction and the conveying direction.

The width W of the pressure chambers 12P is 300 μm or less. The length L of the pressure chambers 12P is 350 μm or less. The width W is the length in the paper width direction and the length L is the length in the conveying direction. The width W of the pressure chambers 12P is 225 μm, for example. The length L of the pressure chambers 12P is, for example, 330 μm.

The connecting channels 12D connect one end of the pressure chambers 12P in the conveying direction to the upper-end of the nozzles 12N, as depicted in FIG. 4. The shape of the connecting channels 12D is cylindrical. The diameter of the connecting channels 12D is larger than the diameter of the upper-end of the nozzles 12N. The ink in the ink tank is supplied to the manifolds 12A via the supply ports 12X and distributed from the manifolds 12A to the individual channels 12B when the pump 10 depicted in FIG. 2 is driven by the controller 5.

When the volume of the pressure chambers 12P is reduced by driving the piezoelectric elements 13X, described below, pressure is applied to the ink in the pressure chambers 12P. The ink to which pressure is applied is ejected as ink droplets from the nozzles 12N through the connecting channel 12D.

The ink supplied to the manifolds 12A via the supply ports 12X but not distributed to the individual channels 12B returns to the ink tank through the return ports 12Y.

The actuator 13 is fixed to the upper surface of the flow channel member 12, as depicted in FIG. 4. The actuator 13 includes a metal vibration plate 131, a piezoelectric layer 132, and a plurality of individual electrodes 133.

The portion of the actuator 13 that overlaps the pressure chambers 12P in the vertical direction functions as the piezoelectric elements 13X. The piezoelectric elements 13X are independently deformable according to the electric potential given to the individual electrodes 133.

The piezoelectric elements 13X are thin-film piezoelectric elements. The thickness T of the thin-film piezoelectric elements is 5 μm or less. In this embodiment, the thickness T is, for example, 3 μm. The thin-film piezoelectric elements are so-called micro electro mechanical systems (MEMS). The piezoelectric elements 13X includes the thin-film piezoelectric layer 132 and the thin-film individual electrodes 133, which are formed in turn on the upper surface of the vibration plate 131.

The vibration plate 131 is located on the upper surface of the flow channel member 12 to cover the plurality of pressure chambers 12P. The piezoelectric layer 132 is located on the upper surface of the vibration plate 131. The individual electrodes 133 are located on the upper surface of the piezoelectric layer 132 so as to overlap the pressure chambers 12P in the vertical direction.

The vibration plate 131 and the plurality of individual electrodes 133 are electrically connected to the driver IC 14. The driver IC 14 maintains the potential of the vibration plate 131 at ground potential while varying the potential of the individual electrodes 133. The vibration plate 131 serves as a common electrode which is an electrode common to the plurality of piezoelectric elements 13X.

The driver IC 14 generates drive signals based on control signals from the controller 5 and supplies the drive signals to the individual electrodes 133. The drive signal changes the potential of the individual electrodes 133 between the predetermined drive potential and the ground potential.

The following is a description of the experiments and analyses performed by the inventors of the present application.

The inventors of the present application noticed that the diameter D of the opening of the nozzles 12N and the taper angle θ of the nozzles 12N affect the drive voltage applied to the piezoelectric elements 13X to eject a predetermined amount of ink droplets from the nozzles 12N, and conducted experiments using several experimental heads 1 with different diameters D and taper angles θ. The configurations other than the diameter D and the taper angle θ are the same for the experimental heads 1.

In the experiment, the driving voltage was applied to the piezoelectric elements 13X of each of the experimental heads 1 to eject ink droplets from the nozzles 12N, and the driving voltage was actually measured. The relationship between the diameter D and the drive voltage and the relationship between the taper angle θ and the drive voltage were derived from the results of the actual measurements.

Figure 5:
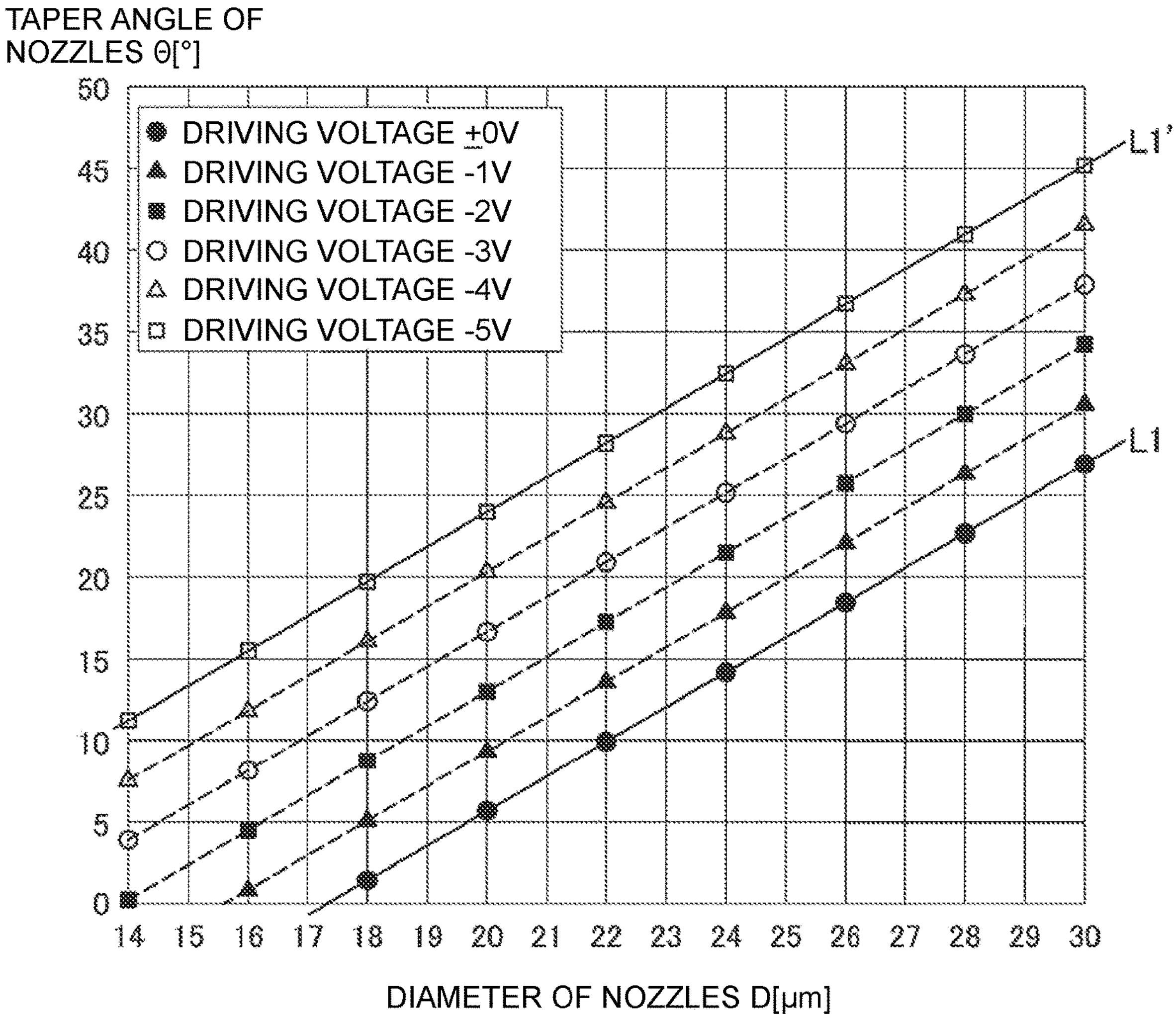
FIG. 5 depicts a graph indicating a relationship between the nozzle diameter D and the drive voltage, and a relationship between the nozzle taper angle θ and the drive voltage.

FIG. 5 indicates the results of the analysis. In FIG. 5, the reference value of the drive voltage is set at 20 V. The combination of the diameter D and the taper angle θ corresponding to the drive voltage of the reference value (±0 V) is indicated by the plots. The combination of the diameter D and the taper angle θ corresponding to the drive voltage 1 V lower than the reference value (−1 V) is indicated by the plots. The combination of the diameter D and the taper angle θ corresponding to the drive voltage 2 V lower than the reference value (−2 V) is indicated by the plots. The combination of the diameter D and the taper angle θ corresponding to the drive voltage of 3 V lower than the reference value (−3 V) is indicated by the plots. The combination of the diameter D and the taper angle θ corresponding to the drive voltage of 4 V lower than the reference value (−4 V) is indicated by the plots. The combination of the diameter D and the taper angle θ corresponding to the drive voltage of 5 V lower than the reference value (−5 V) is indicated by the plots.

In FIG. 5, a straight line L1 is a straight line connecting plots of the combinations of the diameter D and the taper angle θ corresponding to the drive voltage (±0 V) of the reference value, and is consistent with the formula of "$\theta=2.1\times D-36.4$" for the diameter D [μm] and the taper angle θ [°]. A straight line L1' is a straight line connecting the plots of the combination of the diameter D and the taper angle θ corresponding to the drive voltage (−5 V) that is 5 V lower than the reference value, and is consistent with the formula of "$\theta=2.1\times D-18.2$" for the diameter D [μm] and the taper angle θ [°].

FIG. 5 indicates that when the diameter D [μm] and the taper angle θ [°] satisfy the relationship of "$\theta\geq2.1\times D-36.4$", the drive voltage applied to the piezoelectric element 13X can be lowered (i.e., not to exceed the above standard value) even when the piezoelectric element 13X is driven at a high drive frequency. Furthermore, it can be seen that when the diameter D [μm] and the taper angle θ [°] satisfy the relationship of "$\theta\geq2.1\times D-18.2$", the drive voltage applied to the piezoelectric element 13X can be made even lower (i.e., 5 V lower than the above standard value). Therefore, in this embodiment, each of the heads 1 is configured so that the diameter D [μm] and the taper angle θ [°] satisfy the relationship of "$\theta\geq2.1\times D-36.4$" and "$\theta\geq2.1\times D-18.2$".

The inventors have also found that if the diameter D is too small (specifically, 22 μm or less), it is not possible to eject a sufficient amount of ink droplets for recording, and if the taper angle θ is too large (specifically, 450 or more), the slope of the lateral wall defining the nozzles 12N is too large, causing the nozzles 12 N, and the meniscus of nozzles 12N is easily broken. Therefore, in this embodiment, each of the heads 1 is configured so that the diameter D [μm] and the taper angle θ [°] satisfy "$D>22$" and "$\theta<45$", in addition to satisfying "$\theta\geq2.1\times D-36.4$". When "$D>22$" is satisfied, a sufficient amount of ink drops can be ejected for recording. By satisfying "$\theta<45$", the meniscus of the nozzles 12N is difficult to break. In other words, by satisfying "$D>22$" and "$\theta<45$", ink droplets can be ejected stably from the nozzles 12N. Here, "stable ejection" means that both ejection of ink droplets of sufficient quantity for recording and the meniscus of nozzles 12N is difficult to break are achieved.

To further enhance the effect of being able to eject a sufficient amount of ink droplets for recording, each of the heads 1 is configured in this embodiment so that the diameter D [μm] further satisfies "$D\geq25$".

The nozzles 12N in this form are defined by a metal plate 127. In this case, the nozzles 12N are often formed by a punching process, and if the taper angle θ exceeds 25°, a large variation in the diameter D of the nozzles 12N is caused by the amount of the mold pressed into the plate 127 during the punching process. Therefore, in this embodiment, the heads 1 are configured so that the nozzle taper angle θ [°] further satisfies $\theta\leq25$. This prevents large variations in the diameter D of the nozzles 12N from occurring even when the nozzles 12N are formed by the punching process.

When the piezoelectric elements 13X are driven at a high drive frequency, the subsequent ink droplet is ejected before the tail of the preceding ink droplet is separated from the meniscus of the nozzles 12N. As a result, the tail of the preceding ink droplet is connected to the tail of the following ink droplet. It is desirable to shorten the pinch-off time (Pinch-Off-Time) to prevent this kind of ink droplet connection. The pinch-off time is the time from the point when the drive signal for ink droplet ejection is applied to the piezoelectric elements 13X to the point when the tail of the droplet is separated from the meniscus of the nozzles 12N. The pinch-off time is inversely related to the critical drive frequency of the piezoelectric elements 13X, and the higher the critical drive frequency, the shorter the pinch-off time. Therefore, in this embodiment, each of the heads 1 is configured so that the critical drive frequency is 50 kHz or higher. This prevents ink droplets from connecting even when the piezoelectric elements 13X are driven at a high drive frequency.

As described above, according to this embodiment, the diameter D [μm] of the nozzles 12N and the taper angle θ [°] of the nozzles 12N satisfy three relational equations ($\theta\geq2.1\times D-36.4$, $D>22$, and $\theta<45$). In a case that the relational equation of "$\theta\geq2.1\times D-36.4$" is satisfied, the drive voltage applied to the piezoelectric elements 13X can be lowered even when the piezoelectric elements 13X are driven at a high drive frequency. Furthermore, in a case that the relational equations of "$D>22$" and "$\theta<45$" are satisfied, the ink droplets can be stably ejected from nozzles 12N.

The critical drive frequency of the piezoelectric elements 13X is 50 kHz or higher. This prevents ink droplets from connecting even when the piezoelectric elements 13X are driven at a high drive frequency, as described above.

The diameter D [μm] of the nozzles 12N further satisfies "$D\geq25$". This allows a more sufficient amount of ink droplets to be ejected from the nozzles 12N.

The nozzles 12N are defined by a metal plate 127, and the taper angle θ [°] of the nozzles 12N further satisfies $\theta\leq25$. This prevents large variations in the diameter D of the nozzles 12N, even when the nozzles 12N are formed by the punching process as described above.

The diameter D [μm] of the nozzles 12N and the taper angle θ [°] of the nozzles 12N further satisfy $\theta\geq2.1\times D-18.2$. This further lowers the drive voltage applied to the piezoelectric elements 13X, as explained with reference to FIG. 5.

In a case that the thickness X of the nozzles 12N exceeds 50 μm, the flow path resistance of the nozzles 12N is too large, resulting in the need to apply a high drive voltage to the piezoelectric elements 13X to eject a predetermined amount of the ink droplets from the nozzles 12N. In this embodiment, the thickness X of the nozzles 12N is 50 μm or less, so the above problem does not occur.

As depicted in FIG. 4, each of the nozzles 12N has a lower-end (one end) from which ink droplets are ejected and an upper-end (other end) closer to the pressure chambers 12P than the lower-end (one end), and has a constant taper angle θ from the lower-end (one end) to the upper-end (another end). In this case, the configuration of the nozzles 12N is simpler and the head 1 can be manufactured at a lower cost compared to a configuration in which the taper angle θ varies between one end and the other end of the nozzles 12N or a configuration in which a step is generated between the one end and the other end of the nozzles 12N.

The nozzles 12N are located at a pitch of 300 dpi or higher per row. In this case, the heads 1 can be made smaller and high image quality can be obtained.

Each of the nozzles 12N has a circular opening (see FIG. 3). In this case, even if manufacturing variation occurs in nozzle 12N, it is difficult to cause variation in the shape and landing position of the ink droplets ejected from nozzle 12N.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

Modification

Although the embodiments of the present disclosure have been described above, the present disclosure is not limited to the embodiments described above. The present disclosure can be varied within the scope of the claims.

In the embodiment described above, the electrodes of the piezoelectric element are in a two-layer configuration including the individual electrodes and the common electrode, but may also be in a three-layer configuration. The three-layer configuration means, for example, a configuration including drive electrodes to which high and low potentials are selectively given, high potential electrodes held at a high potential and low potential electrodes held at a low potential.

The type of the liquid ejecting head in this disclosure is not limited to the inkjet head of the line type, but may be the inkjet head of the serial type.

The target for ejecting droplets is not limited to paper. For example, the target of ejected droplets may be cloth, substrate, or plastic.

The droplets ejected from the nozzles are not limited to ink droplets. For example, the droplets may be droplets of a processing solution that agglomerates or precipitates the components in the ink.

The present disclosure is not limited to printers, but is also applicable to facsimiles, copiers, and multifunctional machines. The present disclosure is also applicable to droplet ejection systems used for applications other than image recording. For example, the present disclosure is applicable to a droplet ejection system that ejects conductive liquid onto a substrate to form a conductive pattern.

What is claimed is:

1. A liquid ejecting head comprising:

a flow channel member formed with a flow channel including a nozzle and a pressure chamber connected to the nozzle;

a piezoelectric element fixed to the flow channel member and configured to apply pressure to liquid in the pressure chamber to eject droplets of the liquid from the nozzle, wherein a natural frequency Fr of the flow channel is greater than 120 kHz, and a diameter D [μm] of the nozzle and a taper angle θ [°] of the nozzle satisfy:

$$\theta \geq 2.1 \times D - 36.4,$$

$$D > 22\ \mu\text{m, and}$$

$$\theta < 45°.$$

2. The liquid ejecting head according to claim 1, wherein a critical drive frequency of the piezoelectric element is 50 kHz or higher.

3. The liquid ejecting head according to claim 1, wherein the nozzle diameter D [μm] satisfies D≥25 μm.

4. The liquid ejecting head according to claim 1, wherein the nozzle is defined by a metal member, and the taper angle θ [°] of the nozzle satisfies θ≤25°.

5. The liquid ejecting head according to claim 1, wherein the nozzle diameter D [μm] and the nozzle taper angle θ [°] satisfy θ≥2.1×D−18.2.

6. The liquid ejecting head according to claim 1, wherein a thickness of the nozzle is 50 μm or less.

7. The liquid ejecting head according to claim 1, wherein the nozzle includes one end from which the droplets are ejected and the other end closer to the pressure chamber than the one end of the nozzle, and the taper angle from the one end to the other end is constant.

8. The liquid ejecting head according to claim 1, wherein the nozzle is one of a plurality of nozzles aligned at a pitch of 300 dpi or more per row.

9. The liquid ejecting head according to claim 1, wherein an opening of the nozzle is circular.

* * * * *